United States Patent [19]

Braden

[11] 4,067,842

[45] Jan. 10, 1978

[54] POLYSULPHIDE RUBBERS

[75] Inventor: Michael Braden, London, England

[73] Assignee: The London Hospital Medical College, London, England

[21] Appl. No.: 667,743

[22] Filed: Mar. 17, 1976

[30] Foreign Application Priority Data

Mar. 17, 1975 United Kingdom ............... 11057/75
Mar. 25, 1975 United Kingdom ............... 12533/75

[51] Int. Cl.$^2$ ............................................. C08K 5/10
[52] U.S. Cl. ............................. 260/31.6; 260/31.8 Z; 260/33.8 R; 260/37 R; 260/79; 260/79.1
[58] Field of Search ...................... 260/31.6, 37 R, 79, 260/79.1; 252/428

[56] References Cited

U.S. PATENT DOCUMENTS

| 3,046,248 | 7/1962 | Molnar | 260/79.1 X |
| 3,362,927 | 1/1968 | Lochridge | 260/79.1 X |
| 3,455,854 | 7/1969 | Deltieure | 260/79.1 X |
| 3,637,574 | 1/1972 | Millen | 260/79 X |
| 3,637,612 | 1/1972 | Bertozzi | 260/79.1 R X |
| 3,923,754 | 12/1975 | Pellico | 260/79 |

*Primary Examiner*—Lewis T. Jacobs
*Attorney, Agent, or Firm*—Ladas, Parry, Von Gehr, Goldsmith & Deschamps

[57] ABSTRACT

A catalyst composition, suitable for the ambient temperature curing of polysulphide rubbers, comprises zinc carbonate, an organic sulphur-containing accelerator containing a disulphide linkage (e.g. a thiazole, thiuram or dithiocarbamate), and a sulphur/amine complex. The composition contains from 15 to 90% by weight, based on the weight of zinc carbonate, of the organic accelerator and the sulphur/amine complex is preferably a sulphur/dialkylamine complex, the weight ratio of sulphur to amine in the sulphur/amine complex preferably being from 20 : 1 to 5 : 1 and the sulphur/amine complex being present in the composition in an amount of from 0.2 to 8% by weight, based on the weight of zinc carbonate.

19 Claims, No Drawings

POLYSULPHIDE RUBBERS

The invention also provides an ambient temperature curable composition comprising a polysulphide rubber together with a curing composition as defined above, containing from 15 to 75% by weight of zinc carbonate, based on the weight of polysulphide rubber; and containing a total of from 50 to 120% by weight, based on the weight of polysulphide rubber, of zinc carbonate, organic accelerator and sulphur/amine complex.

This invention is concerned with improvements in and relating to fluid polysulphide rubbers and, more particularly, to catalyst systems for the room temperature curing of polysulphide rubbers and polysulphide rubbers cured therewith.

Polysulphide rubbers are well known and are commercially available; for example under the Registered Trade Mark "Thiokol" e.g. Thiokol LP2.

The polysulphide rubbers are lightly branched linear polymers, the basic chains of which contain repeating units of the formula:

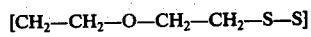

[CH$_2$—CH$_2$—O—CH$_2$—CH$_2$—S—S]

Various catalyst systems have been proposed for curing such rubbers. The most common catalyst is lead dioxide but other metallic oxides, e.g. zinc peroxide and p-quinone dioxide can be used. More recently a zinc oxide/thiuram disulphide system has been proposed. This latter system generally proves adequate but suffers from the disadvantage that the curing times involved are generally relatively long and whilst this may not be a disadvantage in many applications it can be in certain other applications. Thus, for example, polysulphide rubbers have found use as dental impression materials and in this case a material having a relatively short curing time, i.e. of the order of 10 minutes or less is desirable.

Further, for dental uses some of the previously proposed catalysts present toxicity problems, problems of dimensional stability or may have an unpleasant taste.

It has now been found, in accordance with the present invention, that a polysulphide rubber may be cured, to give a relatively rapid cure at ambient temperature, e.g. 20 to 40° C, with a catalyst composition comprising zinc carbonate together with an organic sulphur-containing accelerator and a sulphur/amine complex, which latter component serves to prevent any undesired softening of the cured rubber.

According to the invention, therefore, there is provided a catalyst composition, suitable for the ambient temperature curing of polysulphide rubbers, comprising zinc carbonate, from 15 to 90% by weight, based on the weight of zinc carbonate, of an organic sulphur-containing accelerator containing two sulphur linkages and from 0.2 to 8% by weight, based on the weight of zinc carbonate, of a sulphur/amine complex.

The invention also provides an ambient temperature curable polysulphide rubber composition comprising a polysulphide rubber together with a catalyst comprised in accordance with the invention.

A wide variety of organic sulphur-containing accelerators may be used in the compositions of the invention, provided that they contain two sulphur linkage i.e. a disulphide linkage or a sulphur-metal-sulphur linkage. The accelerators may, for example, be of the thiazole, thiuram or dithiocarbamate type and examples of such accelerators include dibenzthiazole disulphide, tetraalkyl thiuram disulphides such as tetramethyl thiuram disulphide, and tetraalkyl dithiocarbamate salts such as zinc tetraethyldithiocarbamate. The accelerator will suitably be present in the catalyst composition in an amount of from 15 to 90% by weight based on the weight of the zinc carbonate, preferably from 25 to 50% by weight thereof and most preferably about 30% by weight thereof. The third ingredient of the catalyst composition of the invention is a sulphur/amine complex and this will generally be a sulphur/dialkylamine (e.g. diethylamine) complex. Suitably, the ratio of sulphur to amine in the complex will be from about 20 to 1 to 5 to 1, preferably about 9 to 1. The sulphur/amine complex will generally be present in the catalyst composition in an amount sufficient to afford from 0.1 to 5%, preferably from 0.5 to 4%, most preferably about 0.4% by weight of sulphur/amine complex based on the weight of polysulphide polymer to which the catalyst is added. Accordingly, it will be understood, the amount of sulphur/amine complex in any particular catalyst composition will depend upon how much catalyst is intended to add to the polymer to be cured. In general terms the catalyst composition in accordance with the invention will be used in relatively high amounts based on the weight of polymer in order to achieve rapid cures, e.g. from 15 to 75%, preferably from 25 to 70% by weight of the zinc carbonate based on the weight of the polymer.

Accordingly, in this case, the catalyst compositions in accordance with the invention will generally contain from 0.2 to 8, preferably from 0.5 to 2% by weight of sulphur/amine complex based on the weight of the zinc carbonate.

The catalyst composition in accordance with the invention may be used to cure the polysulphide rubber per se but, more commonly, the polysulphide rubber will also be used in conjunction with other additives, especially inert fillers and/or plasticizers. Additionally, the polymer may also have compounded therewith pigments and/or coloring agents.

Where the polymer is used in conjunction with a filler this will generally be a mineral filler such as calcium carbonate, titanium dioxide to lithopone. Such a filler may be used in a wide range of amounts up to, for example, 200% by weight based on the polysulphide polymer. Similarly, a wide variety of plasticizers may be used with the polysulphide rubbers such as the halogenated paraffins or the phthalate esters or mixtures of these latter, for example the butyl phthalate butyl glycollate plasticizer sold under the Registered Trade Mark "Santiciser B16". The plasticizers also may be used in widely varying amounts up to 50% by weight, based on the weight of the polysulphide rubber. If it is intended to employ a plasticizer with the polysulphide rubber, it may be convenient to incorporate all or a part of the plasticizer in the catalyst composition so that this latter may be formulated as an easily workable paste which may be readily dispersed with the polysulphide rubber, which latter may also contain some plasticizer.

As indicated above, the catalyst compositions of the invention are particularly useful for use in curing polysulphide rubbers for use of dental impression materials and in this particular instance the catalyst is suitably employed in an amount of from 50 to 120% by weight, preferably about 70% by weight, based on the weight of the polysulphide rubber to be cured. The plasticizer, for this particular application, is preferably a butyl phthalate butyl glycollate plasticizer and is suitably used in an amount of from 15 to 50, preferably about 30% by weight, based on the weight of the polysulphide rubber. A particular suitable filler for use in dental impression material is lithopone and this is conveniently used in an amount of from 100 to 200% by weight, suitably about 150% by weight, based on the weight of the polysulphide rubber. Conveniently a part of the plasticizer will be mixed with the catalyst ingredients to form a paste readily dispersible with the polysulphide rubber. Accordingly, for use as a dental impression material, the polysulphide rubber and catalyst composition will conveniently be marketed as a two-part pack, one pack (the base polymer pack) comprising the polysulphide rubber generally with the filler and some plasticizer and, if desired, pigmenting or coloring agents; and a second pack (the catalyst pack) comprising zinc carbonate, the accelerator, the sulphur/amine complex and, preferably, a portion of the plasticizer. For use in dental impression materials the organic accelerator is preferably a benzthiazole based accelerator.

The use of the catalyst composition of the invention given and products having a hardness (as measured on the I.R.H. scale) of from 28 to 60 and an elongate to breadth of from 100 to 400%.

In order that the invention may be well understood, the following Examples are given by way of illustration only.

The follow two-part compositions were made up.

EXAMPLE 1

| Base Paste | | |
|---|---|---|
| Thiokol LP2 | 300 | parts by weight |
| Lithopone 30% | 443 | parts by weight |
| Santiciser B16 | 105 | parts by weight |
| (Butyl phthalyl butyl glycollate) | | |
| Tioxide AE | 7 | parts by weight |
| (Titanium Dioxide) | | |
| Aerosil 130 | 17 | parts by weight |
| Cobalt blue pigment | 28 | parts by weight |
| Catalyst paste | | |
| Zinc carbonate | 373 | parts by weight |
| Vulcafor MBTS | 269 | parts by weight |
| (Benzothiazyl disulphide) | | |
| Santiciser B16 | 524 | parts by weight |
| Spider sulphur/diethylamine complex (9:1 by weight) | 5.65 | parts by weight. |

EXAMPLE 2

| Base Paste | | |
|---|---|---|
| Thiokol LP2 | 250 | parts by weight |
| Lithopone 30% L | 543 | parts by weight |
| Santiciser B 16 | 50 | parts by weight |
| Tioxide AE | 2 | parts by weight |
| Aerosil 130 | 25 | parts by weight |
| Cobalt blue pigment | 28 | parts by weight |
| Catalyst paste | | |
| Zinc Carbonate | 187 | parts by weight |
| Vulcafor MBTS | 135 | parts by weight |
| Santiciser B16 | 262 | parts by weight |
| Aerosil 130 | 12 | parts by weight |
| Spider sulphur/diethylamine complex | 3 | parts by weight |

EXAMPLE 3

| Base Paste | | |
|---|---|---|
| Thiokol LP2 | 150 | parts by weight |
| Lithopone 30% | 221.5 | parts by weight |
| Santiciser B 16 | 25 | parts by weight |
| Tioxide AE | 35 | parts by weight |
| Aerosil 130 | 8.4 | parts by weight |
| Cobalt blue pigment | 14 | parts by weight |

-continued

Catalyst paste as in Example 2.

EXAMPLE 4

| Base Paste | | |
|---|---|---|
| Thiokol LP2 | 300 | parts by weight |
| Lithopone | 443 | parts by weight |
| Santiciser B16 | 46 | parts by weight |
| Tioxide AE | 7 | parts by weight |
| Aerosil 130 | 17 | parts by weight |
| Cobalt blue pigment | 28 | parts by weight |
| Catalyst paste | | |
| Zinc carbonate | 594 | parts by weight |
| Vulcafor MBTS | 170 | parts by weight |
| Santiciser B16 | 664 | parts by weight |
| Spider sulphur/diethylamine complex (9 : 1 by weight) | 5.65 | parts by weight |

In each case the catalyst paste was mixed with the base plate in a weight ratio of 2 : 7 to give a composition which cured at room temperature within 10 minutes and had a hardness of from 28° to 60° (I.R.H. scale).

I claim:

1. A catalyst composition, suitable for the ambient temperature curing of polysulphide rubbers, comprising zinc carbonate, from 15 to 90% by weight, based on the weight of zinc carbonate, of an organic sulphur-containing accelerator containing two sulphur linkages and from 0.2 to 8% by weight, based on the weight of zinc carbonate, of a sulphur/amine complex.

2. A composition as claimed in claim 1 in which the organic sulphur-containing accelerator is a thiazole, thiuram or dithiocarbamate.

3. A composition as claimed in claim 1 containing from 25 to 50% by weight, based on the weight of zinc carbonate, of the organic accelerator.

4. A composition as claimed in claim 1 in which the sulphur/amine complex is a sulphur/dialkylamine complex.

5. A composition as claimed in claim 1 in which the weight ratio of sulphur to amine in the sulphur/amine complex is from 20:1 to 5:1.

6. A composition as claimed in claim 1 containing from 0.5 to 2% by weight of zinc carbonate, of sulphur/amine complex.

7. A composition as claimed in claim 1 in the form of a paste and also containing a liquid plasticizer.

8. An ambient temperature curable composition comprising a polysulphide rubber together with a curing composition therefor comprising from 15 to 75% by weight of zinc carbonate, based on the weight of polysulphide rubber, from 15 to 90% by weight, based on the weight of zinc carbonate, of an organic sulphur-containing accelerator containing two sulphur linkages, and from 0.1 to 5% by weight, based on the weight of polysulphide rubber, of a sulphur/amine complex.

9. A composition as claimed in claim 8 containing from 25 to 70% by weight of zinc carbonate, based on the weight of polysulphide rubber.

10. A composition as claimed in claim 8 containing from 0.5 to 4% by weight, based on the weight of polysulphide rubber, of sulphur/amine complex.

11. A composition as claimed in claim 8 containing a total of from 50 to 120% by weight, based on the weight of polysulphide rubber, of zinc carbonate, organic accelerator and sulphur/amine complex.

12. A composition as claimed in claim 8 in which the organic sulphur-containing accelerator is a thiazole, thiuram or dithiocarbamate.

13. A composition as claimed in claim 8 in which the sulphur amine complex is a sulphur/dialkylamine complex.

14. A composition as claimed in claim 8 in which the weight ratio of sulphur to amine in the sulphur/amine complex is from 20 : 1 to 5 : 1.

15. A composition as claimed in claim 8 also containing an inert filler.

16. A composition as claimed in claim 15 containing up to 200% by weight, based on the weight of polysulphide rubber, of inert filler.

17. A composition as claimed in claim 8 also containing a plasticiser.

18. A composition as claimed in claim 17 containing up to 50% by weight, based on the weight of polysulphide rubber, of plasticiser.

19. A method of producing a cured polysulphide rubber composition which comprises mixing the rubber with from 50 to 120% by weight, based on the weight of the rubber of a curing composition comprising zinc carbonate, from 15 to 90% by weight, based on the weight of zinc carbonate, of an organic accelerator containing two sulphur linkages and from 0.2 to 8% by weight, based on the weight of zinc carbonate, of a sulphur/amine complex and subsequently allowing the mixture to cure at ambient temperature.

* * * * *